Dec. 6, 1966     D. H. PEDERSEN     3,289,803
EMBOSSING TOOL FOR SELECTIVELY ACCOMMODATING
MATERIAL OF DIFFERENT WIDTHS
Filed May 28, 1965     2 Sheets-Sheet 1
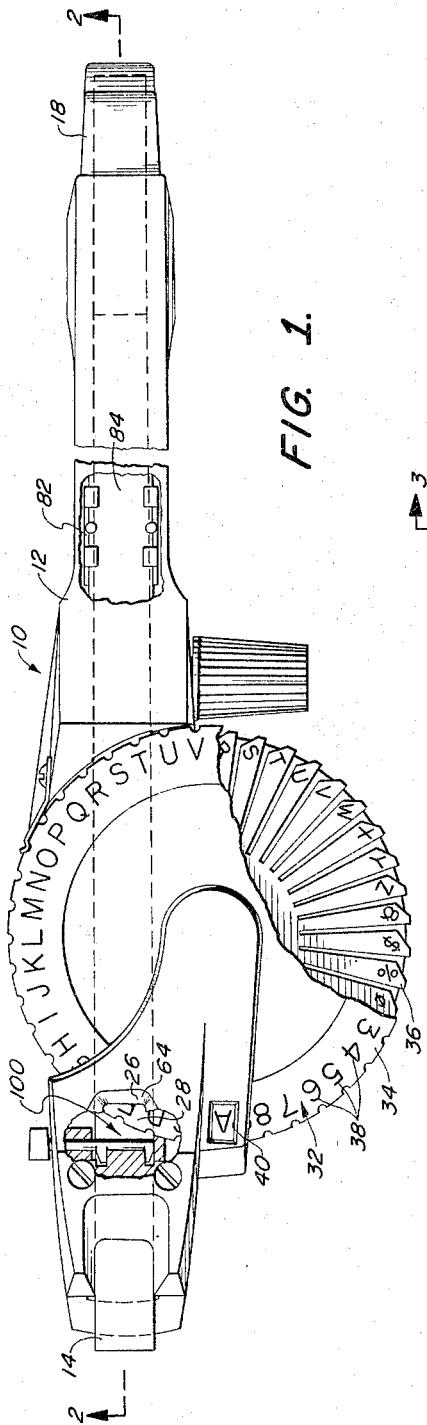
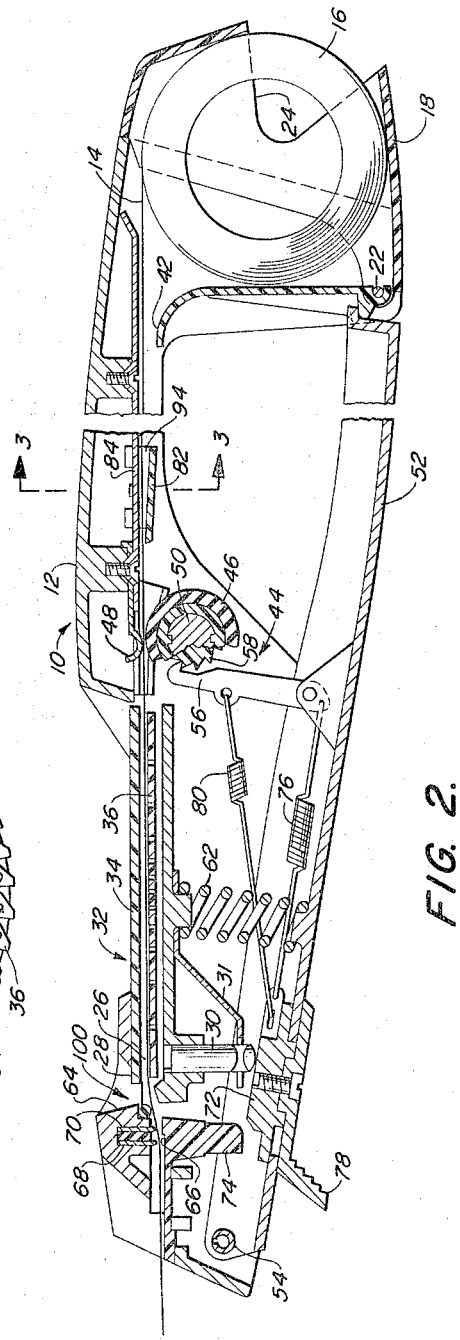
INVENTOR.
DANE H. PEDERSEN
BY
HIS ATTORNEYS

INVENTOR.
DANE H. PEDERSEN
BY
HIS ATTORNEYS

United States Patent Office 3,289,803
Patented Dec. 6, 1966

3,289,803
EMBOSSING TOOL FOR SELECTIVELY ACCOMMODATING MATERIAL OF DIFFERENT WIDTHS
Dane H. Pedersen, Moraga, Calif., assignor to Dymo Industries, Inc., Emeryville, Calif., a corporation of California
Filed May 28, 1965, Ser. No. 459,780
8 Claims. (Cl. 197—6.7)

The invention relates generally to embossing tools and pertains, more specifically, to embossing tools incorporating means for selectively accommodating embossable material in strips of different widths.

A variety of embossing tools are presently available for establishing embossments in strips of embossable material in the fabrication of labels, signs, plates, tags, and the like. More recently, such tools have been developed for embossing various indicia on thin plastic strips formed of sheeted thermoplastic resins which are capable of being cold-formed to establish a contrast color relief enfigurement therein. Usually, the tools employ embossing means for establishing the desired embossments, a supply of strip material and means for feeding the strip material from the supply to the embossing means. Often, the strip material is supplied from a magazine placed in the body of the tool. The strip material is usually in the form of an elongated flexible tape having a constant, closely controlled width.

In embossing indicia on the tape, it is desirable to register the tape accurately with the embossing means, especially in a lateral direction, so that the indicia will be embossed along a uniform well spaced line on the tape. Such a result may be achieved by the employment of a tape guide or track which positively locates the longitudinal edges of the tape to align the tape with the embossing means and maintain the tape in such alignment during embossing operations.

Because the above described tools are generally designed to accept magazine tape supplies, it is relatively easy to insert any one of a series of interchangeable tapes of various widths within a tool; however, because the tape guide must have a different, well defined width for each size tape, a problem has been encountered in providing a tape guide means for accommodating tapes of various widths.

It is therefore an object of the invention to provide an embossing tool which can effectively accommodate embossable material of different widths without the requirement for major changes or adjustments in the tool.

Another object of the invention is to provide means in an embossing tool for guiding and locating embossable strip material as the material is advanced through the tool and wherein a relatively simple adjustment will allow selective accommodation of strip material of different widths.

A further object of the invention is to provide an embossing tool for embossing indicia upon an elongated tape and having a tape guide capable of being readily adapted for positively locating and guiding tapes of more than one width within the tool.

A still further object of the invention is to provide an embossing tool capable of embossing indicia upon interchangeable tape material of different widths and capable of accommodating tape material of different widths without requiring interchangeable component parts and without a significant increase in size or complexity.

Still another object of the invention is to provide a tool as described above having a simplified design, ease of operation and being capable of providing improved performance without a concomitant increase in complexity.

The invention may be described briefly as an improvement in an embossing tool which is capable of establishing an embossment in elongated strip material of different widths and having embossing means therein for establishing the embossment, the improvement comprising a strip guide for laterally aligning and selectively guiding a strip of one width along a fixed longitudinal path passing through the embossing means and positively aligning the strip laterally with the embossing means, and means movable relative to the fixed path for changing the lateral width of the strip guide adjacent the embossing means so as to selectively guide and positively align a strip of a second width laterally with the embossing means.

The invention will be more fully understood and further objects and advantages thereof will become apparent in the following detailed description of an embodiment of the invention illustrated in the accompanying drawings, of which:

FIGURE 1 is a top plan view of a hand operated embossing tool incorporating a strip guide constructed in accordance with the invention;

FIGURE 2 is a side elevational cross-sectional view taken along line 2—2 of FIGURE 1;

Figure 3:
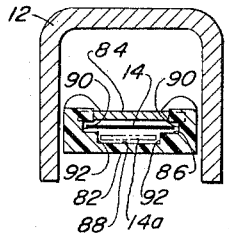
FIGURE 3 is an enlarged cross-sectional view taken along line 3—3 of FIGURE 2.
Figure 4:
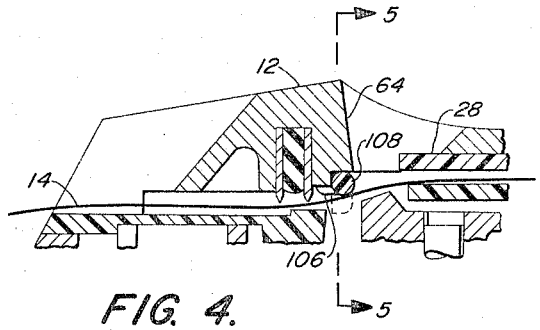
FIGURE 4 is an enlarged detail of the upper left hand portion of FIGURE 2.
Figure 5:
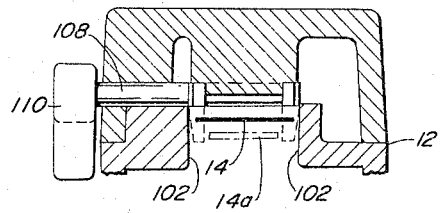
FIGURE 5 is a cross-sectional detail taken along line 5—5 of FIGURE 4.

Referring to the drawings, a hand operated embossing tool is indicated generally at 10 in FIGURES 1 and 2. Tool 10 has a housing 12 which has a general configuration adapted to make the tool easily operated while being held in one hand. The tool is designed to emboss selected indicia in an elongated strip of embossable material such as the variety of thermoplastic resins currently available in the form of plastic tapes of various widths. As seen in FIGURE 2, an embossable tape 14 is supplied in the form of a roll 16 which is received in a tape magazine 18 hinged to the housing at 22. An aperture 24 provides a convenient means for visually determining the amount of tape remaining in the supply as the tool is operated.

Embossing of the tape 14 is accomplished at an embossing station 26 wherein there is located embossing means shown in the form of an embossing die set 28 actuated by a reciprocating actuating member 30 supported beneath the die set by means of retaining leaf spring 31. Die set 28 is one of a series of die sets located in the periphery of selector wheel 32 which is rotatably mounted in housing 12 so that any one of the series of die sets can be located at the embossing station 26 to emboss selected indicia in the tape 14. Selector wheel 32 is made up of upper and lower disks 34 and 36, respectively, one of which carries the die and the other of which carries the punch of each die set. As seen in FIGURE 1, the upper disk 34 is provided with visible characters 38 on the outer face thereof corresponding to the indicia which can be embossed by the selectable die sets. The visible characters are also located along the periphery of the selector wheel, but are circumferentially displaced from their corresponding die sets so that when a particular die set is located at the embossing station 26, the corresponding visible character is located at a selector slot 40 provided in the housing 12.

Tape 14 is fed from supply roll 16 through a duct 42 toward the embossing station 26 by feed means 44 which comprises a feed roll 46 which frictionally grips the tape where a leaf spring 48 presses the tape against the surface of the roll and advances the tape in prescribed increments by being rotated in a counterclockwise direction along with shaft 50 upon which roll 46 is mounted, shaft 50 being journaled in the housing as will be explained hereinafter.

Embossing of tape 14 is accomplished by displacing actuating handle 52, which is pivotally mounted to housing 12 at 54, in a counterclockwise direction to bring actuating member 30 vertically upwardly into contact with a portion of lower disk 36 and continuing such rotation until member 30 actuates the die set 28 positioned at the embossing station 26 and an embossment is established in the tape. At the same time, pawl 56 is moved vertically upwardly to engage the next successive tooth of ratchet wheel 58 which is operatively interengaged with feed roll 46 such that rotation of the ratchet wheel will rotate the feed roll. Rotation of ratchet wheel 58 is precluded during the upward movement of pawl 56 by virtue of spring actuated detent means (not shown) which resiliently engages further teeth of the ratchet wheel. During the counterclockwise displacement of actuating handle 52, helical spring 62 is compressed so that upon completion of the embossing operation and release of actuating handle 52, the handle 52 is urged back to its starting position by spring 62 with a force sufficient to assure that pawl 56 will rotate ratchet wheel 58 in a counterclockwise direction against the deterrent of the detent to rotate feed roll 46 and advance tape 14 through the increment necessary to index the tape for a subsequent embossment. The detent further serves to accurately define the desired increment of rotation so that the tape is automatically indexed a length sufficient to accurately locate each successive embossment on the tape. A window 64 is provided in order to enable the embossed indicia to be viewed immediately after the completion of the embossing operation and the advancement of the tape.

Upon completion of the particular embossed article, the article may be severed from the tape by the displacement of an anvil 66 upwardly to bring tape 14 into contact with cutting blades 68 and 70 mounted in the housing. A manually operable slide member 72 may be selectively positioned below reciprocating member 30, as shown in FIGURE 2, or below a depending portion 74 of anvil 66. Slide member 72 is normally maintained below reciprocating member 30 by means of spring 76 so that actuation of handle 52 will normally produce an embossment; however, similar actuation of handle 52 may be made to sever the tape by the sliding of member 72 to the left, by means of a force exerted in that direction upon lever 78, to the position below anvil portion 74, in which position member 30 will not be actuated but anvil 66 will be driven upwardly. Blade 70 will then sever the tape while blade 68 establishes a tab at the severed end of the completed embossed article. Spring 80 will draw pawl 56 out of engagement with ratchet wheel 58 during the severing operation so that the tape will not be advanced at the completion of the operation.

It will be apparent from the above described construction that the quality and uniformity of the embossed indicia are directly affected by the registry of the tape at the embossing station. This is particularly true of lateral registration across the width of the tape. Thus, it becomes necessary to assure that the tape is laterally aligned accurately with a single prescribed longitudinal path through the embossing station. Such a result is easily accomplished by providing tape guide means having edges and surfaces located and fixed for guiding and maintaining the tape aligned along the prescribed fixed path. However, where a tool of the type described is to be made capable of accepting tapes of different widths, such fixed guides are not acceptable and some means must be provided for making available a specific guide means for each width tape to be accommodated. While interchangeable guide members are a possible solution, the requirement for the removal and insertion of various component parts to convert the tool for handling first a tape of one width and then a tape of another width is undesirable in that such steps are time consuming, annoying and can lead to lost component parts.

Tool 10 has been constructed with a tape guide devised so as to be readily converted for accommodating tapes of different widths without requiring the substitution of any component parts to accomplish the conversion.

As seen in FIGURES 2 and 3, an initial tape guide means is provided in the form of a guide block 82 which is fixed to the housing through attachment to platen member 84 which serves to establish the upper limit of duct 42. Guide block 82 has an upper channel 86 and a lower channel 88, the upper channel being relatively wider than the narrower lower channel. The guide block 82 is thus capable of laterally aligning either one of two elongated strips of material or tapes, the wider tape 14 being laterally aligned by the vertical walls 90 of channel 86 and an alternate narrower tape 14a (shown in phantom) dropping down into channel 88 to be laterally aligned by the vertical walls 92 of the lower channel. It is noted that guide block 82 is placed near the feed means and the channels are tilted slightly in the longitudinal direction. The tilting provides a relatively larger opening at the mouth 94 of block 82 to facilitate the entry of tape 14 during the initial threading of the tape into the tool and also assures that the driving force exerted on the tape by the feed means will draw the tape generally downwardly into its proper channel.

Turning now to FIGURES 1, 2 and 4 through 7, a tape guide 100 is shown located adjacent and juxtaposed with the embossing station 26 and intercepting the prescribed path of tape 14 as the tape passes from the embossing station toward the severing blades 68 and 70 toward the anvil 66.

In order to guide and positively align a tape of relatively greater width, tape guide 100 includes a pair of guide walls 102 fixed in the housing and providing vertical barriers at the lateral boundaries of the generally horizontal path followed by the wider tape 14. A typical width for such a relatively wide tape would be about three-eights of an inch and the lateral distance between guide walls 102 would correspond to that dimension.

When roll 16 of tape 14 is removed from magazine 18 and replaced by a roll of relatively narrower tape (14a), of the order of one-quarter of an inch, for example, guide walls 102 will be spaced too far apart to provide a positive guide for the narrower tape as the tape progresses from the embossing station toward the anvil and severing blades. Thus, tape guide 100 provides a second pair of guide walls 104 spaced from one another a lateral distance corresponding to the width of the narrower tape. Guide walls 104 are located upon opposing faces of a pair of projections 106 depending from a shaft 108 which extends laterally over the path of the tape in a direction generally perpendicular thereto and is disposed above the path and justaposed with the embossing station. The shaft is journaled in housing 12 for rotation about a laterally directed axis, also juxtaposed with the embossing station, between a first position (see FIGURES 1, 4 and 5) wherein the projections 106, and hence guide walls 104, are outside the path of the tape so that the wider tape 14 will be guided by walls 102 and a second position (shown in FIGURE 7 and in phantom in FIGURES 4 and 5) wherein the projections 106 are located such that guide walls 104 lie at the lateral boundaries of the path of the narrower tape 14a to provide vertical barriers for guiding and positively aligning tape 14a so that the center line of tape 14a lies along the same line as that of tape 14 and along the prescribed path.

Figure 6:
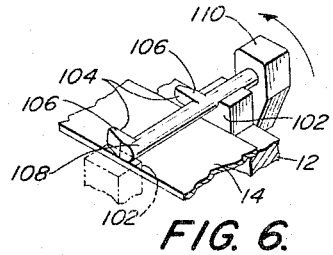
FIGURES 6 and 7 are diagrammatic perspective views illustrating the operation of a strip guide constructed in accordance with the invention.
Figure 7:
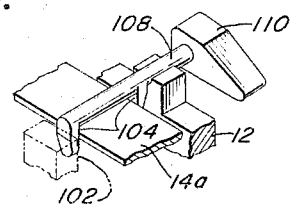

Control means are illustrated in the form of a knob 110 fixed to the shaft 108 outside the housing 12 so that a twist of the knob, as seen in FIGURES 6 and 7, will rotate the shaft between the first and second positions described above to selectively orient the required slot in the desired alignment.

Figure 8:
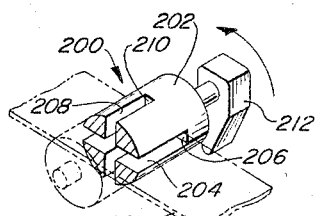
FIGURES 8 and 9 are diagrammatic perspective views illustrating the operation of an alternative strip guide of the invention.
Figure 9:
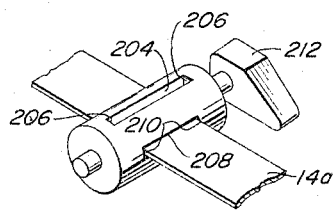

An alternative structure for tape guide 100 is shown in the form of tape guide 200 in FIGURES 8 and 9. Tape guide 200 may be located within tool 10 in the same position as tape guide 100 and includes a drum 202 extending laterally across the path of the tape and mounted in the housing for rotation about a laterally directed axis lying in the path of the tape, generally perpendicular to the longitudinal direction of tape travel. Drum 202 is provided with a first slot 204 passing diametrically through the drum and having a lateral width between end walls 206 corresponding to the width of wider tape 14 so that end walls 206 establish barriers at the lateral boundaries of the tape path and serve as guides to positively align the tape along the path. A second slot 208 also passes diametrically through drum 202 and has a lateral width between end walls 210 corresponding to the width of the narrower tape 14a so that end walls 210 may serve as guides for positively aligning the narrower tape along the prescribed path. Knob 212 is operatively connected to the drum so that turning the knob as indicated will rotate the drum and selectively orient slots 204 and 208 so that either slot may be aligned with the prescribed path as the corresponding tape passes through the aligned slot as illustrated.

Figure 10:
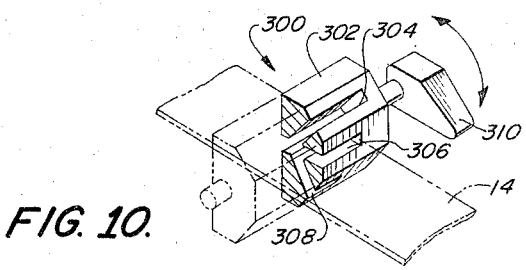
FIGURE 10 is a diagrammatic perspective view of another alternative strip guide of the invention.

FIGURE 10 illustrates another alternative tape guide 300 which may be incorporated into tool 10 in place of tape guide 100 for accommodating tapes of three different widths, i.e., one-quarter inch, three-eights inch and one-half inch tapes. In principle, tape guide 300 closely resembles tape guide 200 in that a drum 302 extends laterally across the path of the tape and is mounted in the housing for rotation about a laterally directed axis lying in the path of the tape, generally perpendicular to the longitudinal direction of tape travel. However, drum 302 is provided with three slots 304, 306 and 308, each of which passes diametrically through the drum and has a width between end walls corresponding to the width of the tape 14 to be accommodated. A knob 310 is connected to the drum so that rotation of the knob will selectively orient one of the slots in alignment with the prescribed tape path so that the end walls of the slot will serve as a guide to positively align the tape passing therethrough with the prescribed path.

Thus, it will be seen that simple and effective means have been provided in an embossing tool for alternatively aligning tapes of several different widths for embossing operations without the necessity of interchangeable component parts or complex structural variations over currently available tools.

It is understood that the foregoing detailed description of an embodiment of the invention is provided by way of example only. Modifications in various details of design and construction may be accomplished without departing from the true spirit and scope of the invention as defined in the appended claims.

What is claimed is:

1. In an embossing tool capable of establishing an embossment in elongated strip material of at least two different widths, the tool including a housing with an embossing station therein, embossing means capable of being located at said station for establishing the embossment, means for advancing the strip mateial from a supply of strip material through the housing to the embossing station in a longitudinal direction along a longitudinal path passing through an entrance to the embossing means and an exit therefrom, and fixed guide means between the supply and the embossing means for aligning the center line of the strip material with the entrance to the embossing means:

a strip guide in the housing at a location longitudinally beyond the exit from the embossing means and the embossing station in the direction away from the supply of strip material and juxtaposed with said exit, said station and the embossing means therein for selectively laterally aligning the center line of any one strip with a predetermined longitudinal line and selectively guiding a strip of one width along a fixed longitudinal path passing through said embossing station and positively aligning the strip laterally with the embossing means at said station; and movable means in said housing juxtaposed with said path and said station at said location, said means being movable relative to said fixed path and cooperating with the strip guide juxtaposed with said station for changing the lateral width of said strip guide so as to selectively guide and positively align a strip of a second width laterally with the embossing means at said station while maintaining said lateral alignment of the center line of the strip along said predetermined longitudinal line.

2. The strip guide in the embossing tool as defined in claim 1 wherein:

said strip guide comprises means in said housing for providing guide channels of lesser and greater widths for accommodating, respectively, narrower and wider widths of strip material; and said movable means comprises control means in said housing for selectively locating any one of said guide channels in said fixed path in juxtaposed relation with said embossing station and the embossing means therein in response to movement of said control means so as to selectively guide and positively align a strip of any one of said widths along said path while maintaining said lateral alignment of the center line of the strip along said longitudinal line.

3. The strip guide in the embossing tool as defined in claim 2 wherein:

said strip guide comprises pairs of guide walls in said housing, the walls of each pair being spaced laterally and lying in longitudinal planes generally normal to the lateral direction for defining the width of strip material which may pass therebetween and positively aligning a strip laterally along said fixed path; and said control means selectively locates a pair of said guide walls at the lateral boundaries of said path to accommodate any one of said different widths of strip material.

4. The strip guide in the embossing tool as defined in claim 3 wherein:

said strip guide includes at least two pairs of guide walls in said housing;

at least one said pair of guide walls being mounted in said housing for rotation about an axis lying beyond the exit from the embossing means and the embossing station in the direction away from the supply of strip material and juxtaposed with said exit, said station and the embossing means therein, between a first position wherein said one pair of guide walls defines lateral boundaries along said fixed path for positively aligning a first strip of one width along said path, and a second position outside said path such that another of said pairs of guide walls is in position to positively align a second strip of another width along said path; and said control means rotates at least said one pair of guide walls between said first and second positions.

5. The strip guide in the embossing tool as defined in claim 3 wherein:

said strip guide comprises first and second pairs of said guide walls, said first pair being laterally spaced from one another a distance corresponding to the wider of said different widths for guiding and positively aligning the wider strip material along said path, and said second pair being mounted in said housing for rotation about an axis lying beyond the exit from the embossing means and the embossing station in the direction away from the supply of strip material and juxtaposed with said exit, said station and the embossing means therein, said second pair being spaced from one another a distance corresponding to the narrower of said different widths and being mounted for rotation about said axis between a first position wherein the second pair defines lateral boundaries along said fixed path for guiding and positively aligning the narrower strip material along said fixed path and a second position outside said fixed path such that the wider strip material may be guided and aligned by the first pair of guide walls; and said control means is operatively connected to said second pair of guide walls for selectively rotating said second guide walls between said first and second positions.

6. The strip guide in the embossing tool as defined in claim 5 wherein said axis is laterally directed, said strip guide including a shaft extending laterally of said path generally perpendicular to said longitudinal direction and displaced therefrom in a direction generally perpendicular to said longitudinal and lateral directions, a pair of projections extending from said shaft in parallel directions and being displaced from one another such that said second guide walls lie on opposing faces of said projections, said shaft being mounted for rotation by said control means about said axis to move said projections toward and away from said fixed path and said guide walls between said first and second positions.

7. The strip guide in the embossing tool as defined in claim 3 wherein:

said strip guide comprises a drum extending laterally across said fixed path and being mounted in said housing for rotation about an axis extending laterally generally perpendicular to said longitudinal direction, said drum lying beyond the exit from the embossing means and the embossing station in the direction away from the supply of strip material and juxtaposed with said exit, said station and the embossing means therein, at least slots passing through said drum in such a direction and in such a position relative to said axis and to one another as to enable any one of said slots to be aligned with said fixed path to provide an uninterrupted path through said drum, each said slot having a different width corresponding to the different widths of said strip material; and said control means is operatively connected to said drum for selectively rotating the drum to orient any one of said slots in alignment with said fixed path.

8. The strip guide in the embossing tool as defined in claim 7 wherein said axis lies in said fixed path, said slots pass diametrically through said drum and said axis and are at an angle to one another such that any one of said slots may be aligned with said fixed path by rotation of the drum, and each slot has a pair of end walls defining the fixed width of the slot, said walls lying in planes generally normal to the axis of rotation, the fixed width between each pair of walls corresponding to each width of strip material such that any pair of end walls can be located at the lateral boundaries of said path for guiding and positively aligning a strip of material of corresponding width along said fixed path.

References Cited by the Examiner

UNITED STATES PATENTS

| | | | |
|---|---|---|---|
| 2,377,978 | 6/1945 | Steeneck | 226—199 X |
| 2,797,090 | 6/1957 | Tholstrup | 226—199 |
| 2,950,072 | 8/1960 | Hayashida et al. | 226—199 |
| 3,006,521 | 10/1961 | Wapling et al. | 226—199 |
| 3,131,843 | 5/1964 | Bentley | 226—199 XR |
| 3,155,215 | 11/1964 | Avery | 197—6.7 |
| 3,204,845 | 9/1965 | Griffith | 226—199 |

ROBERT E. PULFREY, *Primary Examiner.*

E. S. BURR, *Assistant Examiner.*